UNITED STATES PATENT OFFICE

MAX BUCHNER, OF HANOVER-KLEEFELD, GERMANY

PROCESS OF PRODUCING PURE ALUMINIUM COMBINATIONS ADAPTED FOR THE PRODUCTION OF ALUMINIUM

No Drawing. Application filed February 26, 1929, Serial No. 342,944, and in Austria March 5, 1928.

The production of aluminium metal is usually carried out in an electric furnace by decomposition of aluminium oxide, this being brought into a melting bath consisting mainly of cryolite. Although aluminium combinations are found abundantly in nature, only comparatively few deposits supply suitable initial substances for the aluminium production. The reason is, that most of the natural aluminium combinations contain too many impurities, especially iron and silicic acid, whereby the production of aluminium therefrom is rendered very difficult if not impossible. For the utilization of an aluminous substance for the electrolytic aluminium production the main condition is, that it shall be as pure as possible.

This invention relates to the production of pure aluminium combinations suitable for the aluminium production. It consists in that, as intermediate products or end products fluorine combinations of the aluminium are produced by converting an aluminium salt, not containing fluorine, by a metal fluoride in aqueous solution, suspension or in solid state at lower or higher temperature.

End products, capable of being directly used for the aluminium production and which are produced according to this invention, are, besides aluminium fluoride, specially the aluminium alkali-double fluoride combinations, (cryolites). Utilizing aluminium fluoride, as intermediate product, even aluminium oxide may be obtained.

As aluminium salt not containing fluoride, any salt may be used according to the invention, but aluminium nitrate or aluminium chloride are to be used mainly.

According to whether aluminium fluoride or aluminium alkali-double fluoride are to be produced, the reaction substances, aluminium salt not containing fluoride, and the metal fluorides, will be proportioned accordingly. For the production of cryolites, of which the combination $3NaF \cdot AlF_3$ possesses the greatest importance, aluminium nitrate will be reacted upon with sodium fluoride, or also potassium fluoride, ammonium fluoride and so forth, as illustrated for instance by the following equation:

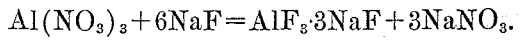
$$Al(NO_3)_3 + 6NaF = AlF_3 \cdot 3NaF + 3NaNO_3.$$

The initial substances in the quantitative proportion stated are allowed to react in aqueous solutions or aqueous suspensions, preferably while heated and agitated (stirred), whereupon after a certain time the corresponding cryolites are produced in a pure form with formation of those metallic nitrates, the metallic fluorides of which are used for the reaction.

As aluminium nitrate, and also aluminium chloride and aluminium sulphate, contain water of crystallization the components, after having been previously intimately mixed, may also be allowed to act upon each other by heating them within very wide temperature limits, to produce the corresponding cryolites. It is possible to work with quite little liquid and even with solid substances. The reaction of the aluminium salt not containing fluorine with the metallic fluoride can be carried out under heating, stirring or other mechanical treatments, as well as under pressure.

The aluminium salt not containing fluorine can be made from any aluminous raw materials, as for instance clay, by treatment with strong mineral acid. Calcined clay is for instance extracted by means of a mineral acid at increased temperature. Besides the alumina the impurities of the aluminous material, as iron, magnesium, alkali and the like, go into solution, while eventually titanium and always the silicic acid remain insoluble. The dissolved alumina salt is filtered off with its impurities from the insolubles and the obtained solutions which with regard to aluminium may be basic or acid, are reacted upon with fluorides.

The mineral acid serving for treating the aluminous raw material can be recuperated, according to the invention, in the simplest manner from the metal salt free from fluorine resulting from the reaction of the aluminium salt with metallic fluoride, a portion or the total quantity of the metallic fluoride being eventually re-formed at the same time. The following equations illustrate a manner of carrying out the recuperation of the acid and simultaneous recuperation of the metal fluoride:

$$2KNO_3 + H_2SiF_6 = K_2SiF_6 + 2NNO_3$$
$$K_2SiF_6 (heat) = 2KF + SiF_4$$
$$CaF_2 + SiF_4 + H_2SO_4 = H_2SiF_6 + CaSO_4$$

For the recuperation of the acid I use, as shown by the above equations, a complex hydrofluoric acid, which reacts with the resulting metal salt free from fluorine. This acid, necessary for the treatment of the aluminous raw material, is liberated and separated from the complex hydrofluoric salt formed.

The complex hydrofluoric salt is then decomposed by heating into simple metallic fluoride and fluoride of an element supplying complex fluorine combinations. The metallic fluoride is used for reaction with the aluminium salt, while the volatile fluoride ($SiF_4$ of the equations) is used for re-forming the complex hydrofluoric acid.

The following equations show another possibility for the recuperation of the metallic fluoride required for the conversion of the aluminium salt into an aluminium fluorine combination:

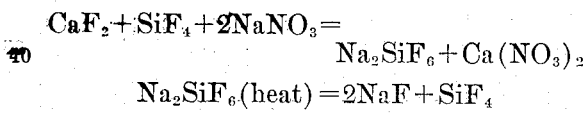

$$Na_2SiF_6 (heat) = 2NaF + SiF_4$$

From the sodium nitrate obtained is formed, by reaction with calcium fluoride and silicon fluoride in presence of acid, on the one hand, calcium nitrate and, on the other hand, sodium silico fluoride, the latter decomposed by heating to liberate sodium fluoride, which can serve for reaction with the aluminium salt, while the silicon fluoride liberated at the same time can be used for the production of the sodium silico fluoride. If it is desired to obtain by the new process aluminium oxide, the raw materials to be used for the reaction of the aluminium salt not containing fluorine with metallic fluoride will be preferably used in such quantity, that a metal salt containing the acid bound in the aluminium salt and the base bound to the fluorine, and aluminium fluoride are formed, the latter being then submitted to a further treatment. In such a reaction there is formed in the aqueous medium a precipitate, which contains aluminium fluoride and, when one has started from ferrous solutions, also a portion of the iron, while the main portion of the iron, and also the other soluble substances, remain in solution. The solution is then filtered off from the insoluble fluoride, and the aluminium fluoride is heated with such alkali-carbonates or alkaline earths, carbonates or caustic alkalies, or caustic alkaline earths, that form with aluminium fluoride the corresponding fluorides and soluble aluminates. The aluminate-solution is then filtered from the insoluble fluoride, and the aluminates decomposed according to any of the commonly used methods.

These manners of carrying out the process may be illustrated by the following examples:

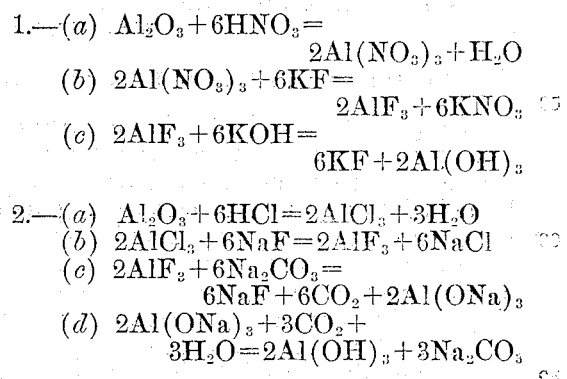

By this manner of production an alumina is obtained which is practically perfectly pure, immaterial whether one starts from rich or poor bauxites or from aluminium silicates of any kind, especially clay. An aluminate liquor is obtained, which owing to the decomposing of the raw material by an acid is absolutely free from silicic acid and owing to the subsequent treatment of the fluorides absolutely free from iron. The aluminate liquor is, notwithstanding impure initial substances, purer than that which is obtained by any of the commonly used methods. The aluminium hydroxide obtained contains at the utmost a few traces of sodium and fluorine, which are however not considered impurities in the fused electrolyte.

When for the extraction of the aluminous materials acids are used, which possess the property of not dissolving iron or of separating insoluble salts that take up the polluting iron, the further advantage is obtained that, in contradistinction to the production of aluminates from bauxite, only very small quantities of iron have to be removed from the aluminate while preparing it from the aluminium fluoride and caustic alkali or caustic alkaline earth.

Also in this form of carrying out the new process the metallic fluorides used for the conversion with the aluminous salt free from fluorine, can always be recuperated and used again for the formation of the aluminium fluoride. The iron which pollutes the same can for instance be extracted by dilute acids, as the fluorides are as a rule very slightly soluble in acids.

Also the caustic alkalies or carbonates necessary as auxiliary substances may be used in the cycle. It may be specially mentioned that, in this form of carrying out the process, all residues are obtained in a form easy to filter.

The acid used for the decomposition of the aluminous raw material, and which according to the above described manner of carrying out the process is obtained in form of alkaline or earth alkaline salts, may also be recuperated, as mentioned above, with the aid of complex hydrofluoric acid and used for fresh treatment of the raw material.

Another possibility of producing alumina from the aluminium fluoride obtained in the reaction with metallic fluoride consists in acting under heating on the aluminium fluoride formed with saturated or superheated steam or other agents forming fluorine combinations at atmospheric pressure or in a gas diluted space or in a vacuum, with or without conducting over the aluminium fluoride gas or air. By this process the production of the aluminium oxide is much shortened, a number of chemical and technical advantages being thus obtained. When the aluminium fluoride obtained is heated, for instance by steam, hydrofluoric acid and aluminium oxide are produced. The aluminium oxide obtained is extraordinarily pure; dense and heavy, and is obtained at once in the calcined state so that generally no subsequent calcination is necessary. The measure presents the further considerable advantage, that at the same time an aluminium oxide is produced which is free from alkali, and the thus obtained product is further free from silicic acid, and in general free from all disturbing impurities which can not be avoided in other processes of producing aluminium oxide. The following equations illustrate by way of example the manner of carrying out the process:

$$2Al_2O_3.2SiO_2.2H_2O + 12HNO_3 = 4Al(NO_3)_3 + 4SiO_2 + 10H_2O$$
$$4Al(NO_3)_3 + 12NaF = 4AlF_3 + 12NaNO_3$$
$$4AlF_3 + 6H_2O = 2Al_2O_3 + 12HF$$
$$12NaNO_3 + 12HF = 12NaF + HNO_3$$

As the above equations show, the process can for instance be conducted so that the hydrofluoric acid is produced in the one phase of the process, which is then, caused to act upon the metallic salt obtained at the production of the aluminium fluoride, whereat the mineral acid necessary for the decomposition of the aluminous raw material, and at the same time also the metallic fluoride serving for the conversion with the aluminium salt free from fluorine to aluminium fluoride are obtained. This process can therefore be conducted in a cycle, and, on the other hand, combined with the production of valuable waste substances as for instance potassium nitrate or hydrofluoric acid.

When, however, it is desired to obtain, instead of hydrofluoric acid, silicon fluoride and pure alumina, pure silicic acid has to be added to the aluminium fluoride and the thermic decomposition has to be carried out in the presence of the same.

$$AlF_3 + 3SiO_2 = 2Al_2O_3 + 3SiF_4$$

If the intention is, to obtain silicon fluoride as by-product, this silicum fluoride can be used for the most various purposes in the chemistry of the fluorine combinations.

Another manner of carrying out the process, which also leads directly to the aluminium oxide, produces the same with utilization of silicic acid and represents a complete cyclic process, will be explained by way of example by the following equations:

1. $2Al_2O_3.2SiO_2.2H_2O + 12HNO_3 = 4Al(NO_3)_3 + 4SiO_2 + 10H_2O$

2. $4Al(NO_3)_3 + 12NaF = 4AlF_3 + 12NaNO_3$

3. $4AlF_3 + 3SiO_2 = 2Al_2O_3 + 3SiF_4$

4. $3SiF_4 + 2H_2O = 2H_2SiF_6 + SiO_2$

5. $4NaNO_3 + 2H_2SiF_6 = 4HNO_3 + 2Na_2SiF_6$

6. $2Na_2SiF_6 + W^x) = 2SiF_4 + 4NaF$

7. $2CaF_2 + 2SiF_4 + 4NaNO_3 + \frac{1}{x}HNO_3 = 2Na_2SiF_6 + 2Ca(NO_3)_2 + \frac{1}{x}HNO_3$ 8. $2Na_2SiF_6 + W^x) = 2SiF_4 + 4NaF$ 9. $2CaF_2 + 2SiF_4 + 4NaNO_3 + \frac{1}{x}HNO_3 = 2Na_2SiF_6 + 2Ca(NO_3)_2 + \frac{1}{x}HNO_3$ 10. $2Na_2SiF_6 + W^x) = 2SiF_4 + 4NaF$ 11. $2SiF_4 + 4H_2O = 2SiO_2 + 8HF$ 12. $4Ca(NO_3)_2 + 8HF = 4CaF_2 + 8HNO_3$.   $x =$ heat.

It is consequently possible to carry out from the silicon fluoride obtained by treatment of the same with hot steam a reaction in the sense of the Equation 11, i. e. with obtention of hydrofluoric acid. This hydrofluoric acid is then made to act upon the salts of the other acid separated in the process, in order to recuperate this acid needed for the decomposition of the raw material (Equation 12). Instead of the decomposition means, i. e. steam and silicic acid, cited in the last mentioned equation, other substances, for instance hydroxides, may be used; the metallic fluoride which may serve for the production of the aluminium fluoride can then be directly obtained. The decomposition is preferably carried through in the presence of saturated or superheated steam in a gas dilated space as, under these conditions, the decomposition can be carried out in the shortest possible time with quantitative yield and considerable saving of heat.

The process is carried through for example according to the following examples.

Example I

By decomposing clay with hydrochloric acid a solution is obtained containing in 100 kgs. 7.8 kgs. $Al_2O_3$ and 0.68 kgs. $Fe_2O_3$. To this solution of aluminiumchloride having a small excess of acid is added 9.6 kgs. NaF, a quantity nearly equivalent to the $Al_2O_3$ in solution. Under heating and stirring the reaction is carried through aluminium fluoride being precipitated, practically free from iron. This $AlF_3$ is separated from the solution and decomposed by heat while simultaneously superheated steam and air is passed off the mass. A pure alumina and pure hydrofluoric acid are obtained.

Example II

To a solution resulting from the decomposition of clay with sulphuric acid containing 7.8 kgs. $Al_2O_3$ and 0.38 kgs. $Fe_2O_3$ as sulphates, aqueous hydrofluoric acid (50%) is added the quantity of which being nearly equivalent to the $Al_2O_3$ in the solution. Aluminium fluoride is thus precipitated, separated from the solution and decomposed by heat in presence of steam. The hydrofluoric acid thus produced is reused for preparing the aluminium fluoride by introducing the hydrofluoric acid into a solution of aluminium sulphate and on the other hand pure alumina is obtained. The sulphuric acid resulting at the production of aluminium fluoride may be used, eventually after purification from fluorine, for decomposing fresh quantities aluminiferous raw material and for producing aluminium sulphate.

Instead of alumina containing solutions obtained by treatment of alumina containing material with muriatic acid or sulphuric acid a solution of aluminium nitrate may be used as starting material. For example, the starting material may be 100 kg. of a solution obtained by treating bauxite with nitric acid and containing 7.5 kgs. $Al_2O_3$ and 0.09 kgs. $Fe_2O_3$.

If silicon tetrafluoride is to be generated during the decomposing of the aluminium fluoride by heat, the obtained aluminium fluoride is dried by a little heat and mixed with silica, as pure precipitated silica. This mixture is heated up to 650° C., under reduced pressure, while dried air is passed over the mass, whereby decomposition into alumina and silicon fluoride takes place.

The silicium fluoride may be introduced into a solution of sodium nitrate, obtainable during the process, in presence of a small amount of acid as contact substance and calciumfluoride in order to generate sodium silicofluoride, which may be used according to the formulas named above.

The present invention permits further to produce in a very simple manner aluminous combinations which, owing to their purity, are specially well suited for the aluminium-metal production. It makes it possible to produce pure alminium oxides as well as aluminium alkali-double fluorides, the agents required as auxiliary substances being conducted through the process in a cycle so that they can be used again and again.

I claim:

1. In the process of producing aluminium fluoride and double compounds of aluminium, the steps which comprise producing a basic aluminium nitrate solution by treating a fluorine free raw material containing alumina with a quantity of nitric acid insufficient to completely form $Al(NO_3)_3$ with the alumina present, and adding an alkali fluoride to the resulting basic aluminium nitrate solution.

2. In the process as defined by claim 1, the further steps which comprise reacting the alkali nitrate, resulting from the production of aluminium fluoride with hydrofluosilicic acid, to reconvert the alkali nitrate to nitric acid, for return to the cycle of operations, and an alkali fluosilicic salt, decomposing the latter to obtain alkali fluoride for the process and silicon fluoride, and reconverting the silicon fluoride into hydrofluosilicic acid for return to the cycle of operations.

3. In the process as defined by claim 1, the further steps which comprise reacting the resulting aluminium and fluorine containing compounds with a caustic alkaline compound to form a soluble aluminate, and converting the latter into aluminium hydroxide in a known manner.

4. In the process as defined by claim 1, the further steps which comprise reacting the resulting aluminium and fluorine containing compounds with an alkali metal carbonate to form a soluble aluminate, and converting the latter into aluminium hydroxide in a known manner.

5. In the process as defined by claim 1, the further steps which comprise decomposing the aluminium and fluorine containing compounds by heat in the presence of available oxygen to form aluminium oxide and a fluorine compound, and reacting the latter with an alkali compound so as to reform the alkali fluoride for the reaction with aluminium nitrate.

6. In the process as defined by claim 1, the further steps which comprise decomposing the aluminium and fluorine containing compounds by steam to form aluminium oxide and hydrofluoric acid, and converting the latter into alkali fluoride for the reaction with aluminium nitrate.

7. In the process as defined by claim 1, the further steps which comprise decomposing the aluminium and fluorine containing compounds in the presence of available oxygen while maintaining the reaction chamber below atmospheric pressure to form aluminium oxide and a fluoride for subsequent reaction with an aluminium salt.

8. In the process as defined by claim 1, the further step which comprises decomposing the aluminium and fluorine containing compounds by steam in the presence of silicic acid to form aluminium oxide and a fluoride for subsequent reaction with an aluminium salt.

In testimony that I claim the foregoing as my invention, I have signed by name.

MAX BUCHNER.